United States Patent
Zhang et al.

(10) Patent No.: US 9,322,083 B2
(45) Date of Patent: Apr. 26, 2016

(54) TECHNOLOGIES OF TWICE DISSOLVED BY HYDROCHLORIC ACID FOR WASTE RARE EARTH LUMINESCENT MATERIALS

(71) Applicant: UNIVERSITY OF SCIENCE AND TECHNOLOGY BEIJING, Beijing (CN)

(72) Inventors: Shengen Zhang, Beijing (CN); Hu Liu, Beijing (CN); Dean Pan, Beijing (CN); Jianjun Tian, Beijing (CN); Min Yang, Beijing (CN)

(73) Assignee: UNIVERSITY OF SCIENCE AND TECHNOLOGY BEIJING, Beijing (CN)

(*) Notice: Subject to any disclaimer, the term of this patent is extended or adjusted under 35 U.S.C. 154(b) by 0 days.

(21) Appl. No.: 14/419,683

(22) PCT Filed: Jan. 17, 2013

(86) PCT No.: PCT/CN2013/070582
§ 371 (c)(1),
(2) Date: Feb. 5, 2015

(87) PCT Pub. No.: WO2014/023092
PCT Pub. Date: Feb. 13, 2014

(65) Prior Publication Data
US 2015/0225813 A1    Aug. 13, 2015

(30) Foreign Application Priority Data

Aug. 10, 2012  (CN) .......................... 2012 1 0285746

(51) Int. Cl.
*C22B 59/00* (2006.01)
*C22B 7/00* (2006.01)

(52) U.S. Cl.
CPC ................ *C22B 59/00* (2013.01); *C22B 7/005* (2013.01); *C22B 7/007* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 7,976,798 B2 * | 7/2011 | Otto | H01J 9/52 423/21.1 |
| 2011/0206580 A1 * | 8/2011 | Porob | C01B 25/305 423/21.5 |

FOREIGN PATENT DOCUMENTS

| | | |
|---|---|---|
| CN | 101307391 A | 11/2008 |
| CN | 101461024 B | 1/2012 |

(Continued)

*Primary Examiner* — Steven Bos
(74) *Attorney, Agent, or Firm* — Novick, Kim & Lee, PLLC; Allen Xue

(57) ABSTRACT

The invention belongs to the field of recycling of resources, in particular to a method for waste rare earth luminescent material by dual hydrochloric acid. First hydrochloric acid was used to dissolve the red phosphor powder ($Y_2O_3$:Eu) priority, and yttrium-rich rare earth chloride solution and residue were obtained after filtered. Residue's major components were green and blue phosphor powder, and the removal of $Ca^{2+}$ in filtrate was conducted by using $Na_2SO_4$, and $CaSO_4$ precipitation separation was conducted to get rich rare earth chloride solution, europium and yttrium. Residue was mixed with alkali to perform alkaline fusion at high temperature to decompose green and blue powder, then sodium aluminate, magnesium, barium and rare earth oxides were obtained. Alkaline fusion products were washed with water, and filtered, and then sodium aluminate solution and residues containing rare earth oxides were obtained.

3 Claims, 1 Drawing Sheet

(56) References Cited

FOREIGN PATENT DOCUMENTS

| CN | 102312095 A | 1/2012 |
| CN | 102312098 A | 1/2012 |
| JP | 2000192167 A | 7/2000 |
| JP | 2004285467 A | 10/2004 |

* cited by examiner

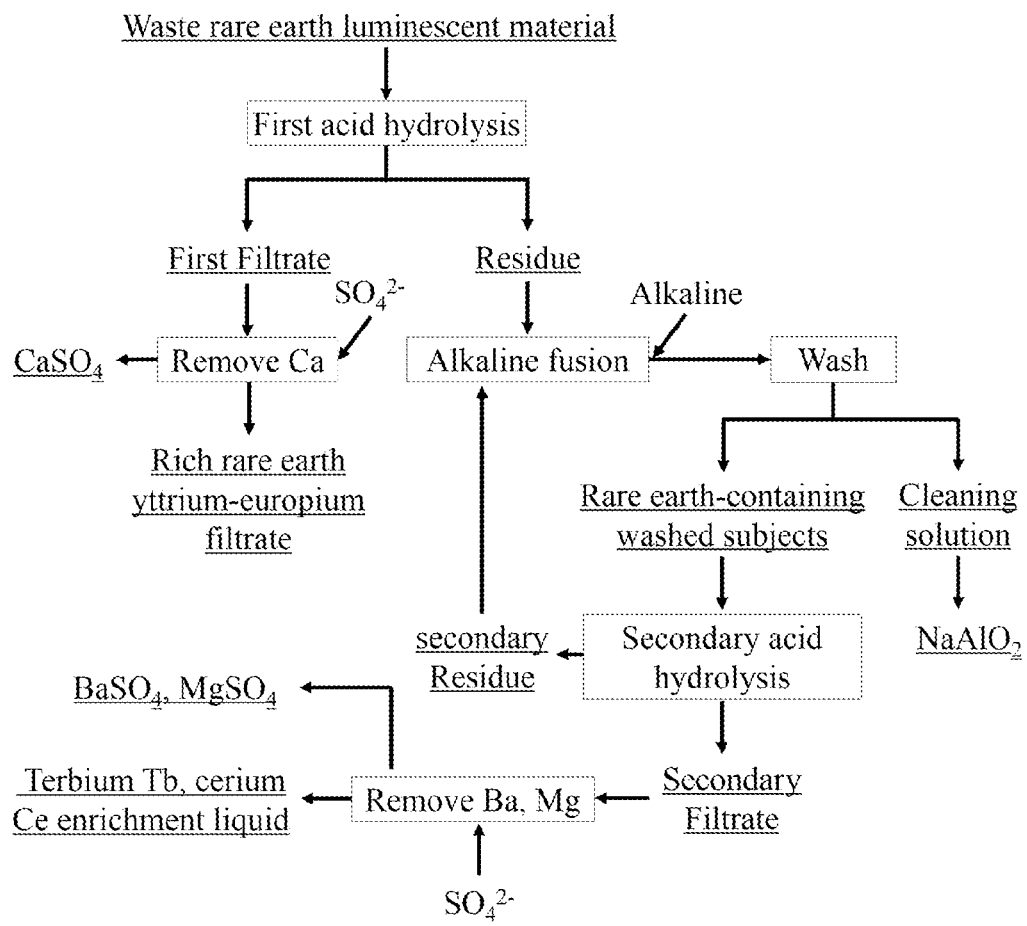

TECHNOLOGIES OF TWICE DISSOLVED BY HYDROCHLORIC ACID FOR WASTE RARE EARTH LUMINESCENT MATERIALS

FIELD OF THE INVENTION

The present invention pertains to resource recycling field, particularly relates to a method for waste rare earth luminescent material by dual hydrochloric acid dissolution.

BACKGROUND

In the process of recovering rare earth elements (REE) from waste rare earth luminescent materials, the methods are researching for the higher recovery rate. But the blue, green phosphor in rare earth luminescent materials were aluminum and magnesium salts which are stable structure. The method of direct acid hydrolysis failed to leach REE effectively, which greatly affects the recovery of rare earth recycling and the development of industrial and result in a waste of valuable rare earth resources.

Currently, the Chinese patent (application number: 200810029417.5) discloses a method of recovering REE from waste fluorescent lamps. By alkaline fusion, the waste rare earth phosphor was directly mixed with alkali and roasted. After blue and green phosphors were decomposed, acid hydrolysis and extraction were used to recycling REE. This approach improved the leaching rate of the REE. This approach improved the leaching rate of the REE. But it caused a large number of unnecessary waste of energy and the alkali consumption, while the non-rare earth elements such as Ca, Mg, Ba, etc., are not reasonably separated from REE, resulting in low efficiency of extraction solvent afterwards. By this patented method, Y, Eu, Tb and Y were leached efficiently step by step, and were preliminarily separated and enriched.

Compared with the prior art, there are some advantages of dual hydrochloric in the present invention as followed: (1) higher REE leach rate; (2) the non-rare earth elements and REE are effectively separated, more easily control to separate and enrich the REE, less extraction pressure in the follow-up process; (3) obvious energy saving effect, more than 50% alkali reduced, less post-extraction drug consumption, and less recovery cost.

CONTENTS

The invention aims to provide a more efficient and more energy-efficient method for treating waste rare earth luminescent materials, which is dual hydrochloric acid dissolution.

First hydrochloric acid was used to dissolve the red phosphor powder ($Y_2O_3$:Eu) priority, filtering the first HCl solution to obtain a first residue and a first filtrate comprising ytterium and europium dissolved from the waste rare earth luminescent material. Residue's major components were green and blue phosphor powder, and by adding $Na_2SO_4$, so that $Ca^{2+}$ cations in the first filtrate form CaSO4 solids that precipitates out from the first filtrate. Rich rare earth chloride solution containing europium and yttrium is obtained. Residue was mixed with alkali to perform at high temperature to decompose green and blue powder, then sodium aluminate, magnesium, barium and rare earth oxides were obtained. Washing the alkaline fusion product with deionized water to transfer $NaAlO_2$ in the alkaline fusion product into the water, and then sodium aluminate solution and residues containing rare earth oxides were obtained. After using secondary hydrochloric acid solution, adding $Na_2SO_4$ solution into the second filtrate so that $Mg^{2+}$ and $Ba^{2+}$ cations in the second filtrate forms $MgSO_4$ and $BaSO_4$ solids that precipitate out from the second filtrate, terbium and cerium rare earth chloride solution is obtained.

The principles of the present invention can be described as the below chemical reactions.

Red phosphor acid dissolution:

$$Y_2O_3:Eu+HCl \rightarrow YCl_3+EuCl_3+H_2O$$

calcium, magnesium, barium removing reactions:

$$Ca^{2+}+SO_4^{2-} \rightarrow CaSO_4$$

$$Mg^{2+}+SO_4^{2-} \rightarrow MgSO_4$$

$$Ba^{2+}+SO_4^{2-} \rightarrow BaSO_4$$

Blue phosphor alkaline fusion:

$$Ce_{0.67}Tb_{0.33}MgAl_{11}O_{10}+NaOH \rightarrow NaAlO_2+MgO+CeO_2+Tb_2O_3$$

Green phosphor alkaline fusion:

$$BaMgAl_{10}O_{17}:Eu+NaOH \rightarrow NaAlO_2+MgO+BaCO_3+Eu_2O_3$$

$$CeO_2+HCl \rightarrow CeCl_4+H_2O$$

$$Tb_2O_3+HCl \rightarrow TbCl_3+H_2O$$

The method of the present invention comprises the following steps:

1. A method for waste rare earth luminescent material by dual hydrochloric acid dissolution, characterized by comprising the steps of:

(1) Treating the waste rare earth luminescent material in a first HCl solution, wherein the rare earth luminescent material comprises a rare earth component and a non-rare earth component. First acid dissolution was performed for waste rare earth luminescent material with HCl solution to dissolve the red phosphor powder ($Y_2O_3$:Eu), after filtering, a first filtrate comprising ytterium and europium are obtained;

(2) Adding a $Na_2SO_4$ solution into the first filtrate so that $Ca^{2+}$ cations in the first filtrate form $CaSO_4$ solids that precipitates out from the first filtrate, and the rich rare earth yttrium-europium filtrate was continued to be extracted, separated and purified successively to obtain high purity rare earth products;

The residue was mixed with alkali for alkaline fusion at high temperature at a mass ratio between the first residue to the alkali of 1:1 to 1:4, wherein the alkali is NaOH, KOH, or a mixture thereof. Alkaline fusion was performed at 400~800° C. for 1~8 hrs, and alkaline fusion products were obtained;

(3) Washing the alkaline fusion products with deionized water for 5 to 8 times to transfer $NaAlO_2$ in the alkaline fusion product into the water, wherein a mass ratio of the deionized water and the alkaline fusion products is 10:1;

(4) Treating the washed alkaline fusion product from Step (3) in a second HCl solution, filtering the second HCl solution to obtain a second filtrate and a second residue; for improving overall recovery of rare earth, the secondary residue was processed again by alkaline fusion technology;

Adding the $Na_2SO_4$ solution into the secondary filtrate, so that $Mg^{2+}$ and $Ba^{2+}$ cations in the second filtrate forms $MgSO_4$ and $BaSO_4$ solids that precipitate out from the second filtrate, and terbium Tb, cerium Ce enrichment liquid was obtained, which would be extracted, separated and purified successively to obtain high-purity rare earth products.

Further, in the step (1), the concentration of HCl solution mentioned is 3~10 mol/L, and the solid-liquid mass ratio (the waste rare earth luminescent material to the HCl solution) is 1:3 to 1:10, and the mixture was acid hydrolyzed and stirred for at 20~80° C. for 1~10 h to get rare earth filtrate.

Further, the concentration of $Na_2SO_4$ mentioned in step (2) is 0.5 to 2 mol/L.

Further, the concentration of HCl solution mentioned in step (4) is 3~10 mol/L, the mixture of washed subjects and acid dissolution was stirred at 20~80° C. for 1~10 h, where the solid-liquid mass ratio of washed subjects to HCl solution was 1:10~1:20, and the secondary filtrate and the secondary residue were obtained.

Further, the concentration of $Na_2SO_4$ mentioned step in (4) is 0.5 to 2 mol/L.

To ensure the decomposition of waste rare earth luminescent materials and improve the rare earth recovery rate, this invention of dual hydrochloric acid dissolution method, firstly red phosphor was dissolved, and then blue and green phosphor were decomposed by alkaline fusion, finally secondary acid dissolution was performed. This method effectively improved the decomposition rate of waste rare earth luminescent materials, further increased the rare earth leaching rate, and Ca, Al, Mg, Ba impurity elements and REE were separated effectively, the simple separation and enrichment between rare earths were achieved. Ultimately, europium-yttrium and terbium cerium enrichment liquid was obtained respectively.

The invention reduced the amount of caustic alkali in alkaline fusion and extraction greatly, relieve the pressure of separation and purification as well. The energy saving effect is remarkable, at the same time this method shares low production cost.

BRIEF DESCRIPTION

FIG. 1 is the flow chart of the present invention.

DETAILED DESCRIPTION OF THE INVENTION

With reference to embodiments below, the present invention will be further described, but the present invention is not limited to the following examples.

Example 1

Using HCl solution of 3 mol/L to dissolve waste rare earth luminescent material, in which the solid-liquid ratio was 1:10, the mixture was acid hydrolyzed and stirred for 3 h at 60° C. before the rare earth filtrate 1 was obtained. Adding an appropriate amount of $Na_2SO_4$, concentration of 0.5 mol/L, to rare earth filtrate 1, $Ca^{2+}$ was transformed to $CaSO_4$ precipitation for recycling, while the rich rare earth yttrium-europium filtrate was got, in which yttrium Y accounted for 94.04% of total rare earths, europium Eu accounted for 5.14% of total rare earths. After HCl solution preferentially dissolved the residue, residue and NaOH were evenly mixed as the mass ratio of residue to NaOH of 1 to 4, and alkaline fusion was performed at 500° C. for 6 h, getting alkaline fusion products. Alkaline fusion products were washed several times with deionized water to wash away the $NaAlO_2$. Using HCl solution of 7 mol/L, acid solution of waste rare earth luminescent materials was stirred for 4 h at 70° C., in which the solid-liquid ratio is 1:10, to get rare earth secondary filtrate and secondary residue, then the secondary residue was return back to alkaline fusion method. Adding an appropriate amount $Na_2SO_4$, concentration of 1 mol/L, to rare earth secondary filtrate, impure ions $Mg^{2+}$, $Ba^{2+}$ were transformed to $(Mg, Ba)SO_4$ precipitation, ultimately getting terbium Tb, cerium Ce enrichment liquor, wherein the cerium content accounted for 49.78% of the total rare earth, terbium Tb content accounted for 29.83% of the total rare earths, yttrium Y content accounted for 10.34% of the total rare earths, Eucontent accounted for 5.61% of the total rare earths. Extraction, separation and purification were performed successively in order to obtain high purity rare earth products. The total rare earth leaching rate was 93.6%, in which yttrium Y leaching rate was 99.1%, europium Eu leaching rate was 98.4%, cerium Ce leaching rate was 74.1%, terbium Tb leaching rate was 70.3%.

Example 2

Using HCl solution of 4 mol/L to dissolve waste luminescent material, in which a solid-liquid ratio was 1:9, the mixture was acid hydrolyzed and stirred for 4 h at 70° C., before the rare earth filtrate 1 was obtained. Adding an appropriate amount of $Na_2SO_4$, concentration of 1 mol/L, to rare earth filtrate 1, $Ca^{2+}$ was transformed to $CaSO_4$ precipitation for recycling, while the rich rare earth yttrium-europium filtrate was got, in which yttrium Y accounted for 93.38% of total rare earths, europium Eu accounted for 5.02% of total rare earths. After HCl solution preferentially dissolved the residue, residue and KOH were evenly mixed as the mass ratio of residue to KOH of 1 to 3, and alkaline fusion was performed at 600° C. for 7 h, getting alkaline fusion products. Alkaline fusion products were washed several times with deionized water to wash away the $NaAlO_2$. Using HCl solution of 8 mol/L, acid solution of waste rare earth luminescent materials was stirred for 5 h at 80° C., in which the solid-liquid ratio is 1:12, to get rare earth secondary filtrate and secondary residue, then the secondary residue was return back to alkaline fusion method. Adding an appropriate amount $Na_2SO_4$, concentration of 1.5 mol/L, to rare earth secondary filtrate, impure ions $Mg^{2+}$, $Ba^{2+}$ were transformed to $(Mg, Ba)\ SO_4$ precipitation, ultimately getting terbium Tb, cerium Ce enrichment liquor, wherein the cerium content accounted for 48.46% of the total rare earths, terbium Tb content accounted for 29.43% of the total rare earths, yttrium Y content accounted for 10.67% of the total rare earths, Eucontent accounted for 5.26% of the total rare earths. Extraction, separation and purification were performed successively in order to obtain high purity rare earth products. The total rare earth leaching rate was 93.6%, in which yttrium Y leaching rate was 99.1%, europium Eu leaching rate was 98.4%, cerium Ce leaching rate was 74.1%, terbium Tb leaching rate was 70.3%.

Example 3

Using HCl solution of 5 mol/L to dissolve waste luminescent material, in which the solid-liquid ratio was 1:8, the mixture was acid hydrolyzed and stirred for 5 h at 80° C., before the rare earth filtrate 1 was obtained. Adding an appropriate amount of $Na_2SO_4$, concentration of 1.5 mol/L, to rare earth filtrate 1, $Ca^{2+}$ was transformed to $CaSO_4$ precipitation for recycling, while the rich rare earth yttrium-europium filtrate was got, in which yttrium Y accounted for 92.98% of total rare earths, europium Eu accounted for 5.08% of total rare earths. After HCl solution preferentially dissolved the residue, residue and NaOH were evenly mixed as the mass ratio of residue to NaOH of 1 to 2, and alkaline fusion was performed at 700° C. for 8 h, getting alkaline fusion products. Alkaline fusion products were washed several times with deionized water to wash away the $NaAlO_2$. Using HCl solution of 9 mol/L, acid solution of waste rare earth luminescent materials was stirred for 6 h at 20° C. in which the solid-liquid ratio is 1:14, to get rare earth secondary filtrate and secondary residue, then the secondary residue was return back to alkaline fusion method. Adding an appropriate amount of $Na_2SO_4$, concentration of 2 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium content accounted for 48.74% of the total rare earths, terbium Tb content accounted for 28.94% of the total rare earths, yttrium Y content accounted for 10.56% of the total rare earths, Eu content accounted for 5.48% of the total rare earths. Extraction, separation and purification were performed successively in order to obtain high purity rare earth products. The total rare earth leaching rate is 94.0%, in which yttrium Y leaching was 99.2%, europium Eu leaching rate was 98.1%, cerium Ce leaching rate was 73.2%, terbium Tb leaching rate was 71.6%.

Example 4

Using HCl solution of 6 mol/L to dissolve waste luminescent material, in which the solid-liquid ratio was 1:7, the mixture was acid hydrolyzed and stirred for 6 h at 20° C., before the rare earth filtrate 1 was obtained. Adding an appropriate amount of $Na_2SO_4$, concentration of 2 mol/L, to rare earth filtrate 1, $Ca^{2+}$ was transformed to $CaSO_4$ precipitation for recycling, while the rich rare earth yttrium-europium filtrate was got, in which yttrium Y accounted for 94.32% of total rare earths, europium Eu accounted for 5.21% of total rare earths. After HCl solution preferentially dissolved the residue, residue and NaOH were evenly mixed as the mass ratio of residue to NaOH of 1 to 1, and alkaline fusion was performed at 800° C. for 1 h, getting alkaline fusion products. Alkaline fusion products were washed several times with deionized water to wash away the $NaAlO_2$. Using HCl solution of 10 mol/L, acid solution of waste rare earth luminescent materials was stirred for 7 h at 30° C. in which the solid-liquid ratio of 1:16, to get rare earth secondary filtrate and secondary residue, then the secondary residue was return back to alkaline fusion method. Adding an appropriate amount of $Na_2SO_4$, concentration of 0.5 mol/L, to rare earth secondary filtrate, impure ions $Mg^{2+}$, $Ba^{2+}$ were transformed to (Mg, Ba) $SO_4$ precipitation, ultimately getting terbium Tb, cerium Ce enrichment liquor, wherein the cerium Ce content accounted for 49.54% of the total rare earths, terbium Tb content accounted for 29.43% of the total rare earths, yttrium Y content accounted for 10.16% of the total rare earths, Eucontent accounted for 5.40% of the total rare earths. Extraction, separation and purification were performed successively in order to obtain high purity rare earth products. The total rare earth leaching rate was 91.7%, in which yttrium Y leaching was 96.8%, europium Eu leaching rate was 96.1%, cerium Ce leaching rate was 70.5%, terbium Tb leaching rate was 71.3%.

Example 5

Using HCl solution of 7 mol/L to dissolve waste luminescent material, in which the solid-liquid ratio was 1:6, the mixture was acid hydrolyzed and stirred for 7 h at 30° C. before the rare earth filtrate 1 was obtained. Adding an appropriate amount of $Na_2SO_4$, concentration of 0.5 mol/L, to rare earth filtrate 1, $Ca^{2+}$ was transformed to $CaSO_4$ precipitation for recycling, while the rich rare earth yttrium-europium filtrate was got, in which yttrium Y accounted for 92.14% of total rare earths, europium Eu accounted for 4.96% of total rare earths. After HCl solution preferentially dissolved the residue, residue and KOH were evenly mixed as the mass ratio of residue to KOH of 1 to 4, and alkaline fusion was performed at 400° C. for 2 h, getting alkaline fusion products. Alkaline fusion products were washed several times with deionized water to wash away the $NaAlO_2$. Using HCl solution of 3 mol/L, acid solution of waste rare earth luminescent materials was stirred for 8 h at 40° C. in which the solid liquid was 1:18, to get rare earth secondary filtrate and secondary residue, then the secondary residue was return back to alkaline fusion method. Adding an appropriate amount of $Na_2SO_4$, concentration of 1 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 47.35% of the total rare earths, terbium Tb content accounted for 29.45% of the total rare earths, yttrium Y content accounted for 10.46% of the total rare earths, Eu content accounted for 5.24% of the total rare earths. Extraction, separation and purification were performed successively in order to obtain high purity rare earth products. The total rare earth leaching rate was 93.1%, in which yttrium Y leaching rate was 98.3%, europium Eu leaching rate was 97.6%, cerium Ce leaching rate was 73.5%, terbium Tb leaching rate was 70.1%.

Example 6

Using HCl solution of 8 mol/L to dissolve waste luminescent material, in which a solid-liquid ratio was 1:5, the mixture was acid hydrolyzed and stirred for 8 h at 40° C., before the rare earth filtrate 1 was obtained. Adding an appropriate amount of $Na_2SO_4$, concentration of 1 mol/L, to rare earth filtrate 1, $Ca^{2+}$ was transformed to $CaSO_4$ precipitation for recycling, while the rich rare earth yttrium-europium filtrate was got, in which yttrium Y accounted for 94.21% of total rare earths, europium Eu accounted for 5.17% of total rare earths. After HCl solution preferentially dissolved the residue, residue and the mixed alkali of NaOH and KOH were evenly mixed as the mass ratio of residue to mixed alkali of 1 to 3 and alkaline fusion was performed at 500° C. for 3 h, getting alkaline fusion products. Alkaline fusion products were washed several times with deionized water to wash away the $NaAlO_2$. Using HCl solution of 4 mol/L, acid solution of waste rare earth luminescent materials was stirred for 9 h at 50° C. in which the solid-liquid ratio of 1:20, to get rare earth secondary filtrate and secondary residue, then the secondary residue was return back to alkaline fusion method. Adding an appropriate amount of $Na_2SO_4$, concentration of 1.5 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 49.32% of the total rare earths, terbium Tb content accounted for 29.95% of the total rare earths, yttrium Y content accounted for 10.56% of the total rare earths, Eu content accounted for 5.79% of the total rare earths. Extraction, separation and purification were performed successively in order to obtain high purity rare earth products. The total rare earth leaching rate was 94.2%, in which yttrium Y leaching rate was 99.1%, europium Eu leaching rate was 98.2%, cerium Ce leaching rate was 74.3%, terbium Tb leaching rate was 71.3%.

Example 7

Using HCl solution of 9 mol/L to dissolve waste luminescent material, in which the solid-liquid ratio was 1:4, the mixture was acid hydrolyzed and stirred for 9 h at 50° C., before the rare earth filtrate 1 was obtained. Adding an appropriate amount of $Na_2SO_4$, concentration of 1.5 mol/L, to rare earth filtrate 1, $Ca^{2+}$ was transformed to $CaSO_4$ precipitation for recycling, while the rich rare earth yttrium-europium filtrate was got, in which yttrium Y accounted for 93.76% of total rare earths, europium Eu accounted for 5.02% of total rare earths. After HCl solution preferentially dissolved the residue, residue and NaOH were evenly mixed as the mass ratio of residue to NaOH of 1 to 2 and alkaline fusion was performed at 600° C. for 4 h, getting alkaline fusion products. Alkaline fusion products were washed several times with deionized water to wash away the $NaAlO_2$. Using HCl solution of 5 mol/L, acid solution of waste rare earth luminescent materials was stirred for 10 h at 60° C. in which the solid-liquid ratio of 1:10, to get rare earth secondary filtrate and secondary residue, then the secondary residue was return back to alkaline fusion method. Adding an appropriate amount of $Na_2SO_4$, concentration of 2 mol/L, to rare earth secondary filtrate, impure ions $Mg^{2+}$, $Ba^{2+}$ were transformed to (Mg, Ba) $SO_4$ precipitation, ultimately getting terbium Tb, cerium Ce enrichment liquor, wherein the cerium Ce content accounted for 50.12% of the total rare earths, terbium Tb content accounted for 30.73% of the total rare earths, yttrium Y content accounted for 9.55% of the total rare earths, Eu content accounted for 5.13% of the total rare earths. Extraction, separation and purification were performed successively in order to obtain high purity rare earth products. The total rare earth leaching rate was 94.1%, in which yttrium Y leaching rate was 98.7%, europium Eu leaching rate was 98.2%, cerium Ce leaching rate was 75.2%, terbium Tb leaching rate was 71.8%.

Example 8

Using HCl solution of 10 mol/L to dissolve waste luminescent material, in which the solid-liquid ratio was 1:3, the mixture was acid hydrolyzed and stirred for 10 h at 60° C., before the rare earth filtrate 1 was obtained. Adding an appropriate amount of $Na_2SO_4$, concentration of 2 mol/L, to rare earth filtrate 1, $Ca^{2+}$ was transformed to $CaSO_4$ precipitation for recycling, while the rich rare earth yttrium-europium filtrate was got, in which yttrium Y accounted for 91.98% of total rare earths, europium Eu accounted for 4.95% of total rare earths. After HCl solution preferentially dissolved the residue, residue and KOH were evenly mixed as the mass ratio of residue to KOH of 1 to 1 and alkaline fusion was performed at 700° C. for 5 h, getting alkaline fusion products. Alkaline fusion products were washed several times with deionized water to wash away the $NaAlO_2$. Using HCl solution of 6 mol/L, in which the solid-liquid ratio was 1:12, acid solution of waste rare earth luminescent materials was stirred for 1 h at 70° C., to get rare earth secondary filtrate and secondary residue, then the secondary residue was return back to alkaline fusion method. Adding an appropriate amount of $Na_2SO_4$, concentration of 0.5 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 50.85% of the total rare earth, terbium Tb content accounted for 31.45% of the total rare earths, yttrium Y content accounted for 8.43% of the total rare earths, Eu content accounted for 4.65% of the total rare earths. Extraction, separation and purification were performed successively in order to obtain high purity rare earth products. The total rare earth leaching rate was 92.4%, in which yttrium Y leaching rate was 97.2%, europium Eu leaching rate was 96.3%, cerium Ce leaching rate was 70.3%, terbium Tb leaching rate was 68.5%.

Example 9

Using HCl solution of 3 mol/L to dissolve waste luminescent material, in which the solid-liquid ratio was 1:10, the mixture was acid hydrolyzed and stirred for 8 h at 70° C., before the rare earth filtrate 1 was obtained. Adding an appropriate amount of $Na_2SO_4$, concentration of 0.5 mol/L, to rare earth filtrate 1, $Ca^{2+}$ was transformed to $CaSO_4$ precipitation for recycling, while the rich rare earth yttrium-europium filtrate was got, in which yttrium Y accounted for 94.06% of total rare earths, europium Eu accounted for 5.12% of total rare earths. After HCl solution preferentially dissolved the residue, residue and NaOH were evenly mixed as the mass ratio of residue to NaOH of 1 to 4, and alkaline fusion was performed at 800° C. for 6 h, getting alkaline fusion products. Alkaline fusion products were washed several times with deionized water to wash away the $NaAlO_2$. Using HCl solution of 7 mol/L, acid solution of waste rare earth luminescent materials was stirred 2 h at 80° C. in which the solid-liquid ratio was 1:14, to get rare earth secondary filtrate and secondary residue, then the secondary residue was return back to alkaline fusion method. Adding an appropriate amount of $Na_2SO_4$, concentration of 1 mol/L, to rare earth secondary filtrate, impure ions $Mg^{2+}$, $Ba^{2+}$ were transformed to (Mg, Ba) $SO_4$ precipitation, ultimately getting terbium Tb, cerium Ce enrichment liquor, wherein the cerium Ce content accounted for 49.53% of the total rare earths, terbium Tb content accounted for 29.43% of the total rare earths, yttrium Y content accounted for 10.54% of the total rare earths, Eu content accounted for 5.62% of the total rare earths. Extraction, separation and purification were performed successively in order to obtain high purity rare earth products. The total rare earth leaching rate was 93.6%, in which yttrium Y leaching rate was 98.8%, europium Eu leaching rate was 98.1%, cerium Ce leaching rate was 73.7%, terbium Tb leaching rate of 71.6%.

Example 10

Using HCl solution of 4 mol/L to dissolve waste luminescent material, in which a solid-liquid ratio was 1:9, the mixture was acid hydrolyzed and stirred for 6 h at 80° C., before the rare earth filtrate 1 was obtained. Adding an appropriate amount of $Na_2SO_4$, concentration of 1 mol/L, to rare earth filtrate 1, $Ca^{2+}$ was transformed to $CaSO_4$ precipitation for recycling, while the rich rare earth yttrium-europium filtrate was got, in which yttrium Y accounted for 94.60% of total rare earths, europium Eu accounted for 5.18% of total rare earths. After HCl solution preferentially dissolved the residue, residue and NaOH were evenly mixed as the mass ratio of residue to NaOH of 1 to 3, and alkaline fusion was performed at 400° C. for 7 h, getting alkaline fusion products. Alkaline fusion products were washed several times with deionized water to wash away the $NaAlO_2$. Using HCl solution of 8 mol/L, acid solution of waste rare earth luminescent materials was stirred for 3 h at 20° C. in which the solid-liquid ratio of 1:16, to get rare earth secondary filtrate and secondary residue, then the secondary residue was return back to alkaline fusion method. Adding an appropriate amount of $Na_2SO_4$, concentration of 1.5 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 51.36% of the total rare earths, terbium Tb content accounted for 30.38% of the total rare earths, yttrium Y content accounted for 10.03% of the total rare earths, Eu content accounted for 5.36% of the total rare earths. Extraction, separation and purification were performed successively in order to obtain high purity rare earth products. The total rare earth leaching rate was 92.5%, in which yttrium Y leaching rate was 96.2%, europium Eu leaching rate was 95.4%, cerium Ce leaching rate was 74.5%, terbium Tb leaching rate was 73.0%.

Example 11

Using HCl solution of 5 mol/L to dissolve waste luminescent material, in which the solid-liquid ratio was 1:8, the mixture was acid hydrolyzed and stirred for 4 h at 20° C., before the rare earth filtrate 1 was obtained. Adding an appropriate amount of $Na_2SO_4$, concentration of 1.5 mol/L, to rare earth filtrate 1, $Ca^{2+}$ was transformed to $CaSO_4$ precipitation for recycling, while the rich rare earth yttrium-europium filtrate was got, in which yttrium Y accounted for 93.93% of total rare earths, europium Eu accounted for 5.06% of total rare earths. After HCl solution preferentially dissolving the residue, residue and KOH were evenly mixed at the mass ratio of residue to KOH of 1 to 2, and alkaline fusion was performed at 500° C. for 8 h, getting alkaline fusion products. Alkaline fusion products were washed several times with deionized water to wash away the $NaAlO_2$. Using HCl solution of 9 mol/L, acid solution of waste rare earth luminescent materials was stirred 4 h at 30° C. in which the solid-liquid ratio was 1:18, to get rare earth secondary filtrate and secondary residue, then the secondary residue was return back to alkaline fusion method. Adding an appropriate amount of $Na_2SO_4$, concentration of 2 mol/L, to rare earth secondary filtrate, impurity ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 50.75% of the total rare earths, terbium Tb content accounted for 29.54% of the total rare earths, yttrium Y content accounted for 10.48 of the total rare earths, Eu content accounted for 5.66% of the total rare earths. Extraction, separation and purification were performed successively in order to obtain high purity rare earth products. The total rare earth leaching rate was 93.2%, in which yttrium Y leaching rate was 98.5%, europium Eu leaching rate of 98.3%, cerium Ce leaching rate was 73.5%, terbium Tb leaching rate was 70.6%.

Example 12

Using HCl solution of 6 mol/L to dissolve waste luminescent material, in which the solid-liquid ratio was 1:7, the mixture was acid hydrolyzed and stirred for 2 h at 30° C., before the rare earth filtrate 1 was obtained. Adding an appropriate amount of $Na_2SO_4$, concentration of 2 mol/L, to rare earth filtrate 1, $Ca^{2+}$ was transformed to $CaSO_4$ precipitation for recycling, while the rich rare earth yttrium-europium filtrate was got, in which yttrium Y accounted for 93.84% of total rare earths europium Eu accounted for 5.03% of total rare earths. After HCl solution preferentially dissolved the residue, residue and the mixed alkali of NaOH and KOH were evenly mixed as the mass ratio of residue to the mixed alkali of 1 to 1, and alkaline fusion was performed at 600° C. for 1 h, getting alkaline fusion products. Alkaline fusion products were washed several times with deionized water to wash away the $NaAlO_2$. Using HCl solution of 10 mol/L, acid solution of waste rare earth luminescent materials was stirred 5 h at 40° C., in which the solid-liquid ratio of 1:20, to get rare earth secondary filtrate and secondary residue, then the secondary residue was return back to alkaline fusion method. Adding an appropriate amount of $Na_2SO_4$, concentration of 0.5 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 51.57% of the total rare earths, terbium Tb content accounted for 30.93% of the total rare earths, yttrium Y content accounted for 10.46% of the total rare earths, Eu content accounted for 5.28% of the total rare earths. Extraction, separation and purification were performed successively in order to obtain high purity rare earth products. The total rare earth leaching rate was 91.8%, in which yttrium Y leaching rate was 97.3%, europium Eu leaching rate was 96.2%, cerium Ce leaching rate was 74.5%, terbium Tb leaching rate was 70.1%.

Example 13

Using HCl solution of 7 mol/L to dissolve waste luminescent material, in which a solid-liquid ratio was 1:6, the mixture was acid hydrolyzed and stirred for 1 h at 40° C., before the rare earth filtrate 1 was obtained. Adding an appropriate amount of $Na_2SO_4$, concentration of 0.5 mol/L, to rare earth filtrate 1, $Ca^{2+}$ was transformed to $CaSO_4$ precipitation for recycling, while the rich rare earth yttrium-europium filtrate was got, in which yttrium Y accounted for 93.75% of total rare earths, europium Eu accounted for 5.01% of total rare earth. After HCl solution preferentially dissolving the residue, residue and NaOH were evenly mixed at the mass ratio of residue to NaOH of 1 to 4 and alkaline fusion was performed at 700° C. for 2 h, getting alkaline fusion products. Alkaline fusion products were washed several times with deionized water to wash away the $NaAlO_2$. Using HCl solution of 3 mol/L, acid solution of waste rare earth luminescent materials was stirred 6 h at 50° C., in which the solid-liquid ratio of 1:10, to get rare earth secondary filtrate and secondary residue, then the secondary residue was return back to alkaline fusion method. Adding an appropriate amount of $Na_2SO_4$, concentration of 1 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 50.78% of the total rare earths, terbium Tb content accounted for 30.36% of the total rare earths, yttrium Y content accounted for 10.54% of the total rare earths, Eu content accounted for 5.73% of the total rare earths. Extraction, separation and purification were performed successively in order to obtain high purity rare earth products. The total rare earth leaching rate was 93.9%, in which yttrium Y leaching rate was 99.2%, europium Eu leaching rate was 98.3%, cerium Ce leaching rate was 74.2%, terbium Tb leaching rate was 71.4%.

Example 14

Using HCl solution of 8 mol/L to dissolve waste luminescent material, in which the solid-liquid ratio was 1:5, the mixture was acid hydrolyzed and stirred for 1 h at 50° C., before the rare earth filtrate 1 was obtained. Adding an appropriate amount of $Na_2SO_4$, concentration of 1 mol/L, to rare earth filtrate 1, $Ca^{2+}$ was transformed to $CaSO_4$ precipitation for recycling, while the rich rare earth yttrium-europium filtrate was got, in which yttrium Y accounted for 93.63% of total rare earths, europium Eu accounted for 4.99% of total rare earths. After HCl solution preferentially dissolved the residue, residue and KOH were evenly mixed as the mass ratio of residue to KOH of 1 to 3, and alkaline fusion was performed at 800° C. for 3 h, getting alkaline fusion products. Alkaline fusion products were washed several times with deionized water to wash away the $NaAlO_2$. Using HCl solution of 4 mol/L, acid solution of waste rare earth luminescent materials was stirred 7 h at 60° C., in which the solid-liquid ratio was 1:12, to get rare earth secondary filtrate and secondary residue, then the secondary residue was return back to alkaline fusion method. Adding an appropriate amount $Na_2SO_4$, concentration of 1.5 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 48.18% of the total rare earths, terbium Tb content accounted for 28.45% of the total rare earths, yttrium Y content accounted for 12.54% of the total rare earths, Eu content accounted for 5.97% of the total rare earths. Extraction, separation and purification were performed successively in order to obtain high purity rare earth products. The total rare earth leaching rate was 92.5%, in which yttrium Y leaching rate was 98.2%, europium Eu leaching rate was 97.4%, cerium Ce leaching rate was 73.8%, terbium Tb leaching rate of 69.5%.

Example 15

Using HCl solution of 9 mol/L to dissolve waste luminescent material, in which the solid-liquid ratio was 1:4, the mixture was acid hydrolyzed and stirred for 5 h at 60° C., before the rare earth filtrate 1 was obtained. Adding an appropriate amount of $Na_2SO_4$, concentration of 1.5 mol/L, to rare earth filtrate 1, $Ca^{2+}$ was transformed to $CaSO_4$ precipitation for recycling, while the rich rare earth yttrium-europium filtrate was got, in which yttrium Y accounted for 94.20% of total rare earths, europium Eu accounted for 5.16% of total rare earths. After HCl solution preferentially dissolved the residue, residue and the mixed alkali were evenly mixed as the mass ratio of residue to the mixed alkali of 1 to 2, and alkaline fusion was performed at 500° C. for 4 h, getting alkaline fusion products. Alkaline fusion products were washed several times with deionized water to wash away the $NaAlO_2$. Using HCl solution of 5 mol/L, acid solution of waste rare earth luminescent materials was stirred for 8 h at 70° C., in which the solid-liquid ratio was 1:14, to get rare earth secondary filtrate and secondary residue, then the secondary residue was return back to alkaline fusion method. Adding an appropriate amount of $Na_2SO_4$, concentration of 2 mol/L, to rare earth secondary filtrate, impure ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 50.75% of the total rare earth, terbium Tb content accounted for 30.32% of the total rare earths, yttrium Y content accounted for 9.53% of the total rare earths, Eu content accounted for 5.26% of the total rare earths. Extraction, separation and purification were performed successively in order to obtain high purity rare earth products. The total rare earth leaching rate was 92.9%, in which yttrium Y leaching rate was 97.4%, europium Eu leaching rate was 96.7%, cerium Ce leaching rate was 73.4%, terbium Tb leaching rate was 71.8%.

Example 16

Using HCl solution of 10 mol/L to dissolve waste luminescent material, in which the solid-liquid ratio was 1:3, the mixture was acid hydrolyzed and stirred for 7 h at 70° C., before the rare earth filtrate 1 was obtained. Adding an appropriate amount of $Na_2SO_4$, concentration of 2 mol/L, to rare earth filtrate 1, $Ca^{2+}$ was transformed to $CaSO_4$ precipitation for recycling, while the rich rare earth yttrium-europium filtrate was got, in which yttrium Y accounted for 93.82% of total rare earths, europium Eu accounted for 5.03% of total rare earths. After HCl solution preferentially dissolved the residue, residue and NaOH were evenly mixed as the mass ratio of residue to NaOH of 1 to 1, and alkaline fusion was performed at 600° C. for 5 h, getting alkaline fusion products. Alkaline fusion products were washed several times with deionized water to wash away the $NaAlO_2$. Using HCl solution of 6 mol/L, acid solution of waste rare earth luminescent materials was stirred for 9 h at 80° C., in which the solid-liquid ratio was 1:16, to get rare earth secondary filtrate and secondary residue, then the secondary residue was return back to alkaline fusion method. Adding an appropriate amount of $Na_2SO_4$, concentration of 0.5 mol/L, to rare earth secondary filtrate, impurity ions $Mg^{2+}$, $Ba^{2+}$ were transformed to (Mg, Ba)$SO_4$ precipitation, ultimately getting terbium Tb, cerium Ce enrichment liquor, wherein the cerium Ce content accounted for 50.47% of the total rare earths, terbium Tb content accounted for 30.57% of the total rare earths, yttrium Y content accounted for 9.54% of the total rare earths, Eu content accounted for 5.26% of the total rare earths. Extraction, separation and purification were performed successively in order to obtain high purity rare earth products. The total rare earth leaching rate was 94.3%, in which yttrium Y leaching rate was 98.7%, europium Eu leaching rate was 98.2%, cerium Ce leaching rate was 74.4%, terbium Tb leaching rate was 70.7%.

The invention claimed is:

1. A method for treating a waste rare earth luminescent material, comprising the steps of:
   (1) treating the waste rare earth luminescent material in a first HCl solution, wherein the rare earth luminescent material comprises a rare earth component and a non-rare earth component, wherein the rare earth component comprises yttrium (Y), europium (Eu), terbium (Tb), cesium (Ce), and the non-rare earth component comprises calcium (Ca), magnesium (Mg), and barium (Ba);
   (2) filtering the first HCl solution to obtain a first residue and a first filtrate comprising yttrium and europium dissolved from the waste rare earth luminescent material;
   (3) adding a $Na_2SO_4$ solution into the first filtrate so that $Ca^{2+}$ cations in the first filtrate form $CaSO_4$ particles that precipitate out from the first filtrate;
   (4) mixing the first residue with an alkali to form a mixture at a mass ratio between the first residue to the alkali of 1:1 to 1:4, wherein the alkali is NaOH, KOH, or a mixture thereof;
   (5) heating the mixture from Step (4) at 400-800° C. for 1-8 hrs to obtain an alkaline fusion product;
   (6) washing the alkaline fusion product with deionized water 5 to 8 times to transfer $NaAlO_2$ in the alkaline fusion product into the water, wherein a mass ratio of the deionized water and the alkaline fusion product is 10:1;
   (7) treating the washed alkaline fusion product from Step (6) in a second HCl solution;
   (8) filtering the second HCl solution to obtain a second filtrate and a second residue; and
   (9) adding $Na_2SO_4$ solution to the second filtrate so that $Mg^{2+}$ and $Ba^{2+}$ cations in the second filtrate form $MgSO_4$ and $BaSO_4$ particles that precipitate out from the second filtrate,
   wherein the first filtrate from Step (3) is rich in yttrium and europium and the second filtrate from Step (9) is rich with terbium and cesium, wherein: in step (1), a concentration of HCl in the first HCl solution is 3-10 mol/L, and a mass ratio between the waste rare earth luminescent material to the first HCl solution is 1:3 to 1:10, and wherein: in step (7), a concentration of HCl in a second HCl solution is 3-10 mol/L, and a mass ratio between the washed alkaline fusion product and the second HCl solution is 1:10 to 1:20.

2. The method according to claim 1, wherein a concentration of $Na_2SO_4$ in the $Na_2SO_4$ solution in step (3) is 0.5 to 2 mol/L.

3. The method according to claim 1, wherein a concentration of $Na_2SO_4$ in the $Na_2SO_4$ solution of step (9) is 0.5 to 2 mol/L.

* * * * *